United States Patent [19]

Kamiya et al.

[11] Patent Number: 4,685,290

[45] Date of Patent: Aug. 11, 1987

[54] ENGINE CONTROL WITH FUNCTION TO ELIMINATE MINUTE PARTICLES IN EXHAUST GAS

[75] Inventors: Sigeru Kamiya; Akikazu Kojima, both of Nukata; Yasuyuki Sakakibara, Nishio, all of Japan

[73] Assignee: Nippon Soken, Inc., Nishio, Japan

[21] Appl. No.: 797,023

[22] Filed: Nov. 12, 1985

[30] Foreign Application Priority Data

Nov. 19, 1984 [JP] Japan .................... 59-242440

[51] Int. Cl.$^4$ ................................. F01N 3/02
[52] U.S. Cl. ........................... 60/274; 60/285
[58] Field of Search .................. 60/274, 285, 286

[56] References Cited

U.S. PATENT DOCUMENTS

| | | | |
|---|---|---|---|
| 4,211,075 | 7/1980 | Ludecke | 60/285 |
| 4,361,028 | 11/1982 | Kamiya et al. | |
| 4,450,681 | 5/1984 | Sato et al. | |
| 4,450,682 | 5/1984 | Sato | 60/303 |
| 4,452,040 | 6/1984 | Kobashi | 60/285 |
| 4,509,327 | 4/1985 | Enga | 60/285 |

FOREIGN PATENT DOCUMENTS

| | | | |
|---|---|---|---|
| 104375 | 1/1983 | Japan | |
| 194020 | 11/1984 | Japan | 60/285 |

Primary Examiner—Douglas Hart
Attorney, Agent, or Firm—Cushman, Darby & Cushman

[57] ABSTRACT

In order to provide a function of eliminating minute particles in exhaust gas to a control apparatus of an internal combustion engine, a filter temperature sensor, inserted in an exhaust path, for measuring a temperature of a filter for trapping minute particles of an exhaust gas, an electric heater for removing the minute particles deposited on the filter by combustion, and a control circuit are provided. In the control circuit, filter recovery is detected, a preheating instruction for raising the filter temperature is generated in accordance with the detection result, completion of the preheating of the filter is decided, an instruction for changing an injection pattern of the fuel injection valve for preheating the filter is generated, and an ON signal is supplied to the electric heater.

9 Claims, 7 Drawing Figures

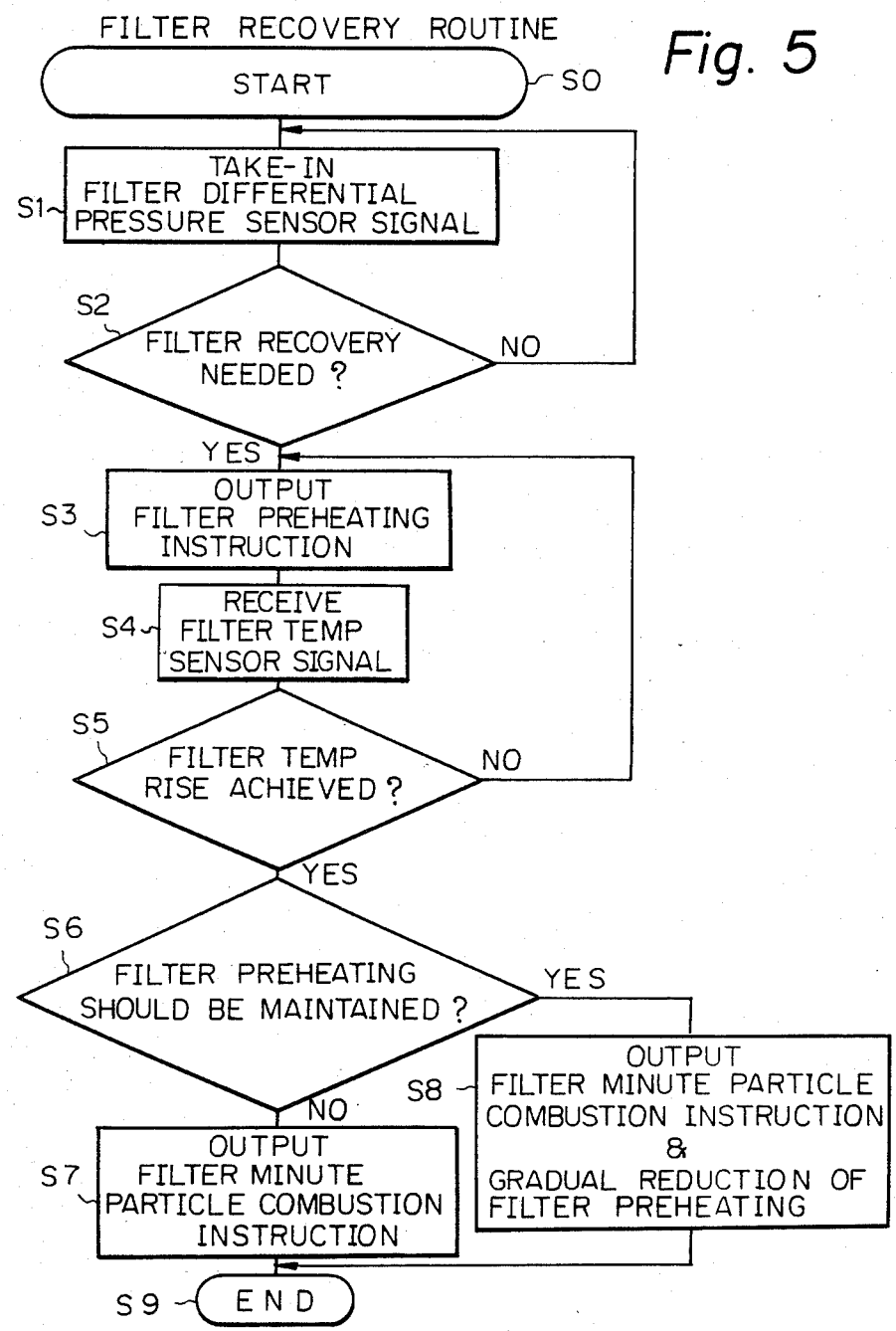

ENGINE CONTROL WITH FUNCTION TO ELIMINATE MINUTE PARTICLES IN EXHAUST GAS

BACKGROUND OF THE INVENTION

1. Field of the Invention

The present invention relates to a method and an apparatus for controlling an internal combustion engine having a function of eliminating minute particles in an exhaust gas. The method and apparatus according to the present invention can be applied to an internal combustion engine having a minute particle eliminating device which traps minute particles in an exhaust gas exhausted from an internal combustion engine of a vehicle and causes the trapped particles to combust, thereby purifying the exhaust gas.

2. Description of the Related Art

In order to trap minute particles such as carbon particles contained in an exhaust gas exhausted from an internal combustion engine, a minute particle trapping device incorporating a filter member comprising a ceramic honeycomb structure of a ceramic foamed member is usually used. In such a device, the air passing resistance of a filter is increased as minute particles are deposited on the filter member, resulting in decreased output. In addition, deposited minute particles degrade the filtering function. For this reason, minute particles deposited on the filter member are periodically removed to restore the function of the filter member of trapping the minute particles.

As a recovery means, a heating means is added to the filter member to heat and ignite the trapped particles, thereby removing them by combustion. When an electric heater is used as the heating means, this can simplify the apparatus. However, since the amount of heat output is small in comparison to that of a light-oil burner and the like, the filter member on which the minute particles are deposited is easily cooled by the exhaust gas flow under normal operating conditions, thereby preventing ignition of the minute particles, and even if ignited, the particles are soon extinguished by the exhaust gas flow.

As a means for improving the ignition property and to avoid quenching during combustion, a bypass flow path for communicating the upstream and downstream sides of the filter and a valve midway along the flow path are provided. In this filter recovery operation, the valve is opened and almost all of the exhaust gas is passed through the bypass flow path, thus considerably decreasing the flow rate of the gas passing through the filter (see, for example, Japanese Unexamined Utility Model Publication (Kokai) No. 58-9910). However, in this method, in addition to the filter, the bypass flow path, the valve, and a driving device for driving the valve must be provided, thereby complicating the system configuration, and rendering mounting of the system on a vehicle difficult.

SUMMARY OF THE INVENTION

The object of the present invention is to provide an apparatus which can perform filter recovery without using a bypass system, based on the concept that a filter is preheated to a proper temperature for recovery and conditions which allow easy ignition and combustion to the filter are realized without bypassing the exhaust gas flow.

According to an aspect of the present invention, there is provided a method of controlling an internal combustion engine with a function of eliminating minute particles in exhaust gas having a fuel injection valve which is provided in the internal combustion engine and in which a fuel injection timing is controlled, a filter temperature sensor, inserted in an exhaust path, for measuring a temperature of a filter for trapping an exhaust gas, and an electric heater for removing by combustion minute particles deposited on the filter. The method includes the steps of detecting recovery of the filter; generating a preheating instruction for increasing a filter temperature based on the detection of filter recovery; deciding, based on a signal from the filter temperature sensor, whether or not a preheating for raising the filter temperature is completed; generating a signal for changing, based on the filter preheating instruction, the injection pattern of the fuel injection valve for the preheating of the filter; and supplying a signal to the electric heater based on the decision on the preheating.

According to another aspect of the present invention, there is provided a control apparatus of an internal combustion engine with a function of eliminating minute particles in the exhaust gas including a fuel injection valve which is provided in the internal combustion engine and in which a fuel injection timing is controlled; a filter temperature sensor, inserted in an exhaust path, for measuring a temperature of a filter for trapping an exhaust gas; an electric heater for removing by combustion minute particles deposited on the filter. The control apparatus also includes a filter recovery detection unit for detecting the recovery of the filter; a filter preheating instruction unit for generating a preheating instruction for raising the filter temperature based on the output from the filter recovery detection unit; a filter preheating decision unit for detecting, based on a signal from the filter temperature sensor, whether or not the preheating for raising the filter temperature is completed; a fuel injection instruction unit for generating a signal for changing the injection pattern of the fuel injection valve for preheating the filter, based on the output from the filter preheating instruction unit; and a filter minute particle combustion instruction unit for supplying a signal to the electric heater based on the output from the filter preheating decision unit.

BRIEF DESCRIPTION OF THE DRAWINGS

FIG. 5 is a flow chart showing the operation flow of the apparatus shown in FIG. 2;

DESCRIPTION OF THE PREFERRED EMBODIMENT

Figure 1:
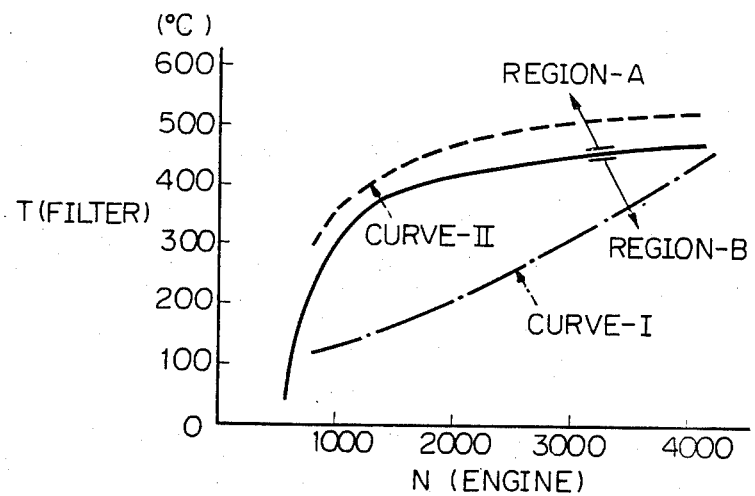
FIG. 1 is a graph for explaining a principle of a method and an apparatus according to the present invention.

Prior to a detailed description of a preferred embodiment, the principle of the method and apparatus according to the present invention will be described with reference to the graph shown in FIG. 1. FIG. 1 shows the conditions of filter recovery by an electric heater in terms of the relationship between an engine speed (abscissa) and a filter temperature (ordinate) immediately before heater conduction. Note that the engine speed plotted along the abscissa is substantially proportional to an exhaust gas flow rate. The exhaust gas volume of the engine used is 2,200 cc, the exhaust gas flow sectional area of the filter is 157 cm$^2$, and the filter volume is 1,800 cc.

As is clearly understood from FIG. 1, a filter temperature which enables the filter recovery abruptly increases in accordance with an increase in engine speed, i.e., the exhaust gas flow rate, and the filter recovery can be performed within a region REGION-A which exceeds a certain temperature determined corresponding to the engine speed. On the other hand, in FIG. 1, an alternate long and short dashed curve, CURVE-I, indicates the relationship between the engine speed and the filter temperature when a vehicle is running on a flat road. It has been found that the entire engine speed region, e.g., 800 to 4,000 rpm, falls in a filter recovery disable region REGION-B. For this reason, conventionally, almost all the exhaust gas is bypassed so as to decrease the filter path exhaust gas volume, thereby attaining the recovery enable region.

According to the method and apparatus of the present invention, the temperature of an exhaust gas itself is increased by a specific technique so as to allow the filter to fall within the recovery enable region. In FIG. 1, a dotted curve CURVE-II indicates the relationship between the engine speed and the filter temperature when a vehicle is running while performing the filter preheating operation according to the method and apparatus of the present invention. In this case, the entire engine speed region falls within the filter recovery enable region REGION-A.

One of the differences between the filter preheating operation of the method and apparatus of the present invention and the prior art technique will be described below. In a diesel engine, as is well known, in order to increase an exhaust gas temperature, the fuel injection timing is delayed. However, when the injection timing is delayed, this induces a decrease in power and unstable combustion. Although the decrease in power can be compensated for by increasing the fuel injection quantity, in a fuel injection system utilizing a conventional mechanical control, it is impossible to perform such an operation without the driver experiencing a change in the driving conditions, and unstable combustion cannot be prevented by any method. In the method and apparatus of the present invention, the above problems can be overcome by using an electronically controlled fuel injection system.

Figure 2:
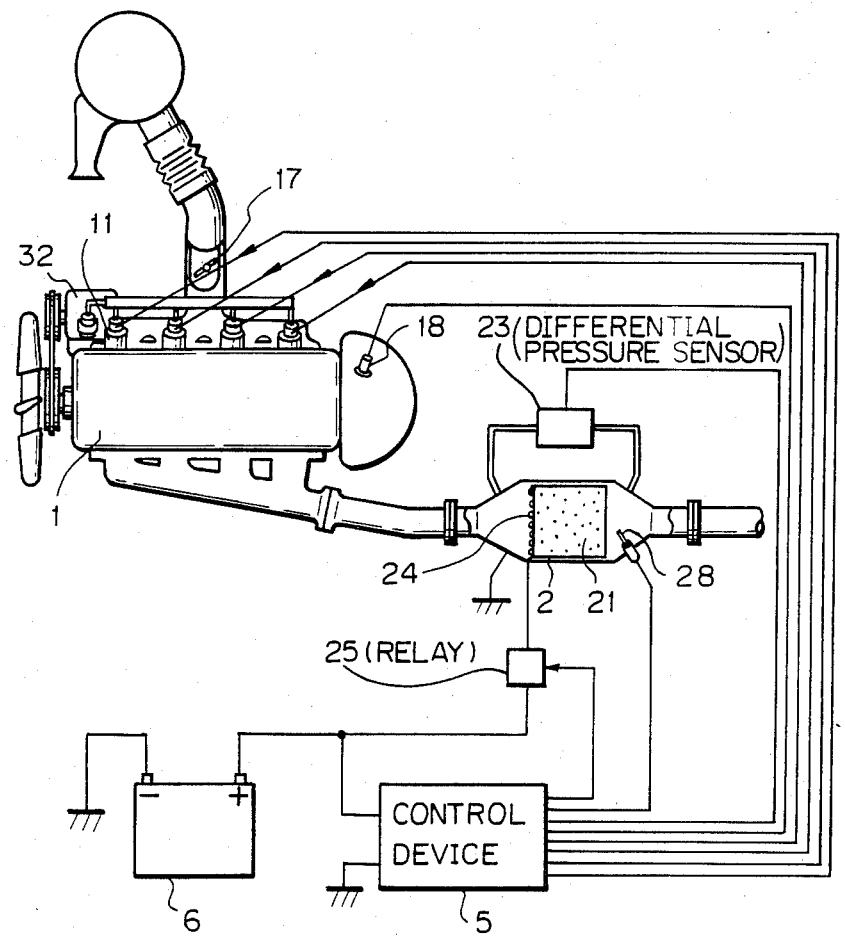
FIG. 2 is a view showing a control apparatus of an internal combustion engine having a function of eliminating minute particles in an exhaust gas according to an embodiment of the present invention.

FIG. 2 shows a control apparatus of an internal combustion engine having a function of eliminating minute particles in exhaust gas. In the apparatus shown in FIG. 2, reference numeral 1 denotes an internal combustion engine main body and 11 an electronically controlled fuel injection valve. Reference numeral 32 denotes a fuel pump for supplying high pressure fuel to the injection valve 11, and 2 a minute particle trapping device which incorporates a trapping filter 21. An electric heater 24 is installed on an end face of the filter 21 at an upstream side thereof. Reference numeral 23 denotes a differential pressure sensor for measuring a pressure loss of the filter 21, and for discriminating a filter recovery timing by detecting an increase in the pressure loss.

Reference numeral 5 denotes a microcomputer as a control apparatus for the overall system, which drives the injection valve 11 in response to a signal from a rotational angle pickup sensor 18 of the engine 1, and drives a relay 25 in the case of filter recovery so as to heat the electric heater 24. Reference numeral 17 denotes an intake throttle valve having a function of increasing an amount of intake air, as needed. Reference numeral 6 denotes a battery mounted in a vehicle.

The filter recovery process used in the above-mentioned system will be explained hereinafter. As the running distance or engine operation interval is increased, the pressure loss through the filter is gradually increased. When a preset pressure loss is detected, the microprocessor 5 changes the operation condition of the engine, more specifically, a fuel injection pattern, in accordance with a predetermined sequence.

Figure 3:
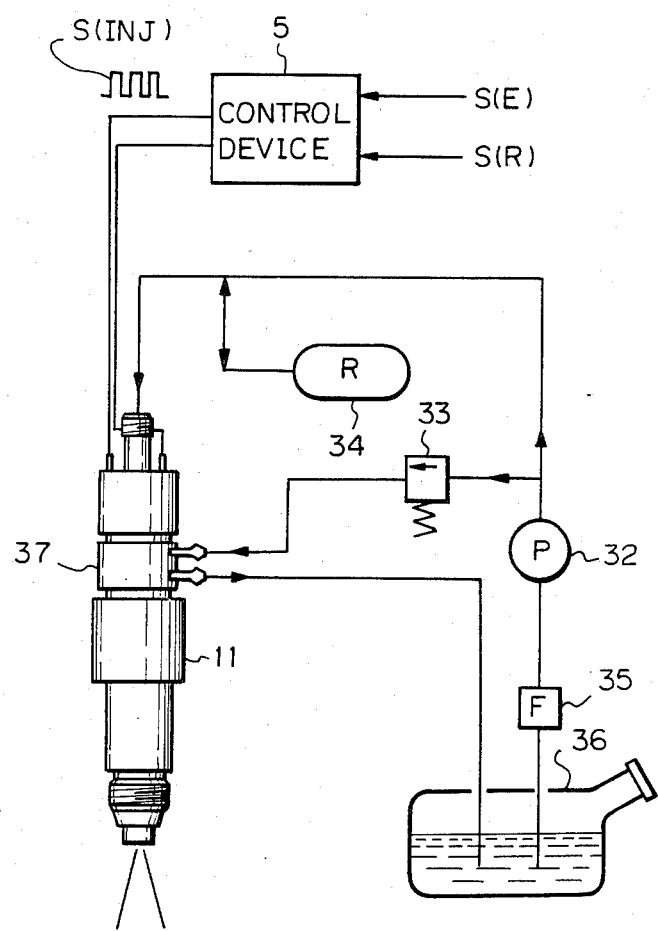
FIG. 3 is a view showing an electronically controlled fuel injection system in the apparatus shown in FIG. 2.

FIG. 3 shows the electronically controlled fuel injection system in the apparatus shown in FIG. 1. Referring to FIG. 3, the injection valve 11 for injecting fuel in response to an electrical signal continuously receives high pressure fuel at 200 to 400 kg/cm$^2$. The fuel has been compressed by the fuel pump 32, adjusted by a pressure adjusting valve 33, and pulsation-removed by a reservoir 34. The control apparatus 5 for controlling the fuel injection receives a signal S(E) indicating engine speed, load, crank angle and the like, and supplies an injection pulse signal S(INJ) to the injection valve in response thereto. The injection valve 11 incorporates an actuator (not shown) comprising a solenoid or a piezoelectric element. The actuator responds to the injection pulse signal so as to inject fuel.

In this manner, according to the electronically controlled fuel injection system of FIG. 3, high pressure fuel is continuously supplied, fuel injection is performed by an electrical signal, and a desired quantity of fuel can be injected at a proper timing. Note that a signal indicated by S(R) in FIG. 3 instructs filter recovery, and the fuel injection pattern is changed by this signal, as will be described later, thereby enabling the filter recovery. In FIG. 3, reference numeral 37 denotes a cooling unit for the actuator. Excess fuel flowing from the pressure adjusting valve 33 passes through the cooling unit 37 and cools the actuator.

A fuel injection pattern during filter recovery will be described hereinafter. When a filter recovery timing is reached, the engine starts a filter preheating operation for increasing the filter temperature until filter recovery is enabled. In the filter preheating operation, by utilizing the characteristics of the electronically controlled injection valve wherein fuel can be injected at any timing, fuel injection is performed in accordance with a pattern considerably different from that of a normal operation state. In this injection pattern, the injection timing is delayed from the normal state, the fuel injection quantity is increased, and fuel injection is divisionally performed a plurality of times.

Figure 4:
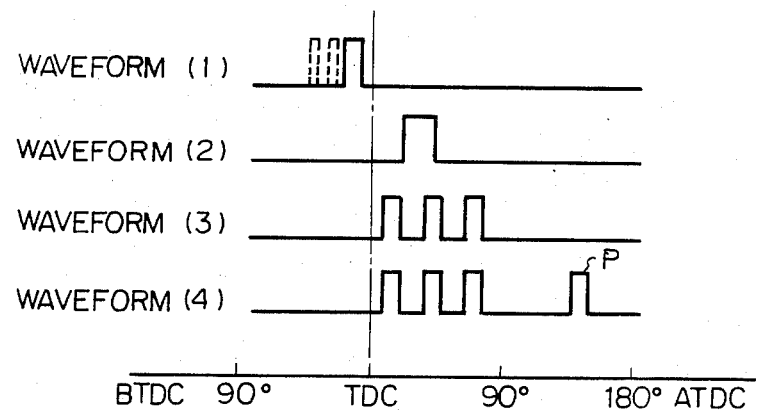
FIG. 4 shows the waveforms of the fuel injection signal in the method and apparatus according to the present invention.

FIG. 4 shows various fuel injection patterns in the normal operation mode and preheating operation mode. A waveform (1) in FIG. 4 indicates an injection pattern in a normal state. Here, fuel injection start timing is at 5° to 20°CA before Top Dead Center (TDC) of the piston compression stroke, and fuel injection is basically performed at every one revolution of the crank shaft (not shown). However, in order to eliminate noise, a small quantity of fuel can be injected once or twice before the basic fuel injection, as indicated by a broken line in FIG. 4, (1).

In contrast to this, waveforms (2), (3) and (4) in FIG. 4 indicate injection patterns for the filter preheating operation. Waveform (2) indicates the basic injection pattern of the filter preheating operation. In this case, the fuel injection timing is delayed considerably from the conventional timing and the fuel injection quantity is increased. When the fuel injection timing is delayed and the fuel injection quantity is increased, the exhaust gas temperature is increased without a change in the engine power. In waveform (2) of FIG. 4, the fuel injection timing is merely delayed. This may result in unstable operation and give rise to a polluted exhaust gas emission due to poor combustion.

Waveform (3) of FIG. 4 is employed to overcome the above drawbacks. The injection timing is delayed and fuel injection is divisionally performed a plurality of times. Although the fuel injection timing is delayed as a whole, since fuel can be injected near the TDC point, the ignition is satisfactory. In addition, since ignition at this time becomes a spark source for fuel injected at a later stage, stable combustion can be achieved as compared with waveform (2) of FIG. 4, and exhaust gas emission pollution can be reduced. This is one of the advantages of the apparatus of the present invention, and the effect will be more specifically described below. In an engine having the above-mentioned exhaust gas volume, when the injection timing is delayed from BTDC10° of the normal state to ATDC15° under operating conditions of an engine speed of 2,000 rpm and an axial torque of 3 kg·m, the exhaust gas temperature is raised by 230° C., but the minute particle exhaust volume is increased to 3.5 times that of the normal state. On the other hand, when a plurality of delayed fuel injections are performed in accordance with waveform (3) of FIG. 4, although the exhaust gas temperature is similarly raised by 230° C., the minute particle exhaust volume is limited to about 1.8 times that of the normal state and engine stability was degraded. Although a delay in the fuel injection timing generally increases the hydrocarbon content, the injection is performed a plurality of times, and that increase can be controlled. In this case, the first injection timing is ATDC15° and the final injection timing is ATDC45°.

Waveform (4) is a further special injection pattern, and is characterized in that injection indicated by P in FIG. 4 is performed near the Bottom Dead Center (BDC) point, and almost all fuel injected at this timing is exhausted without being combusted. On the other hand, although such exhausted fuel reaches the minute particle trapping filter, it comes into contact with the heated electric heater and begins to combust, thereby igniting the minute particles deposited on the filter by combustion heat. That is, waveform (4) has a function to aid the heater in igniting the deposited minute particles.

The operation of the apparatus shown in FIG. 2 will be described with reference to the flow chart shown in FIG. 5. In step S0, a filter recovery routine starts, and in step S1, a filter differential pressure sensor signal is taken in, and is checked in step S2 to decide if filter recovery is needed. If YES in step S2, the flow advances to step S3, and the filter preheating instruction is generated. During the filter preheating, the fuel injection pattern is changed and the exhaust gas temperature is raised so that the filter temperature is raised until ignition and combustion of the minute particles by the electric heater are enabled.

In step S5 a check is made, in accordance with a signal from the temperature sensor 28 and the like, as to whether or not the filter temperature has raised to a required value determined from a current engine speed and the like. If YES in step S5, the flow enters the following ignition/combustion operation. In this ignition/combustion operation, the electric heater mounted at the upstream portion of the filter is energized and heated, thus igniting the minute particles deposited on the filter so as to begin combusting the particles. Then, the combustion area is gradually moved toward the downstream side of the filter, and thus all of the minute particles on the filter are removed by combustion.

The filter preheating operation mode is maintained, or the engine is gradually returned to a normal mode, in accordance with the engine operation conditions. Since the fuel injection quantity is increased in the filter preheating operation mode, the concentration of oxygen remaining in the exhaust gas is decreased; but a certain oxygen concentration is required for combustion of the minute particles. For this reason, when the engine is gradually returned to the normal mode, the oxygen concentration is gradually increased, thereby allowing satisfactory combustion of the minute particles.

The intake throttle valve 17 shown in FIG. 2 can be operated during the filter recovery. In general, ignition and combustion of the minute particles can be easily performed when the exhaust gas flow rate is smaller. For this reason, the intake throttle valve 17 is made half-open during the filter preheating operation and the ignition/recovery operation so as to decrease the amount of intake air, i.e., the exhaust gas flow rate. When the intake air is throttled, the exhaust gas temperature can be effectively raised.

When the intake air is throttled, the engine output is generally reduced. Therefore, throttling is not used in a high load operation mode. Thus, whether or not the intake throttling operation is carried out, and how the preheating mode is changed in the ignition and recovery modes, is determined in accordance with the current engine operation conditions, exhaust gas temperature and the like.

Figure 6:
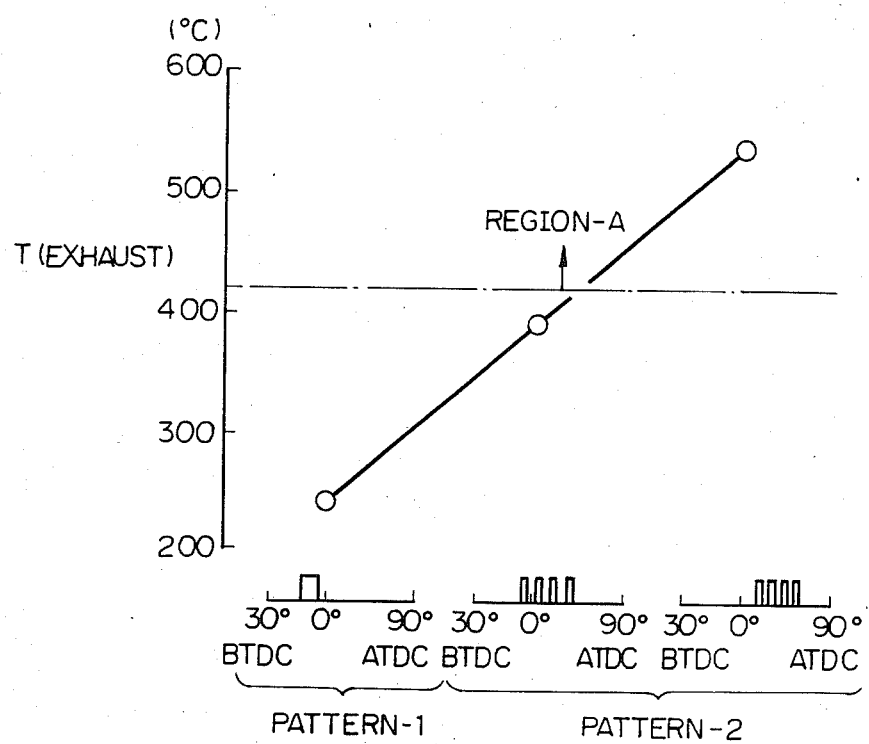
FIG. 6 is a graph for explaining the method and apparatus according to the present invention.
Figure 7:
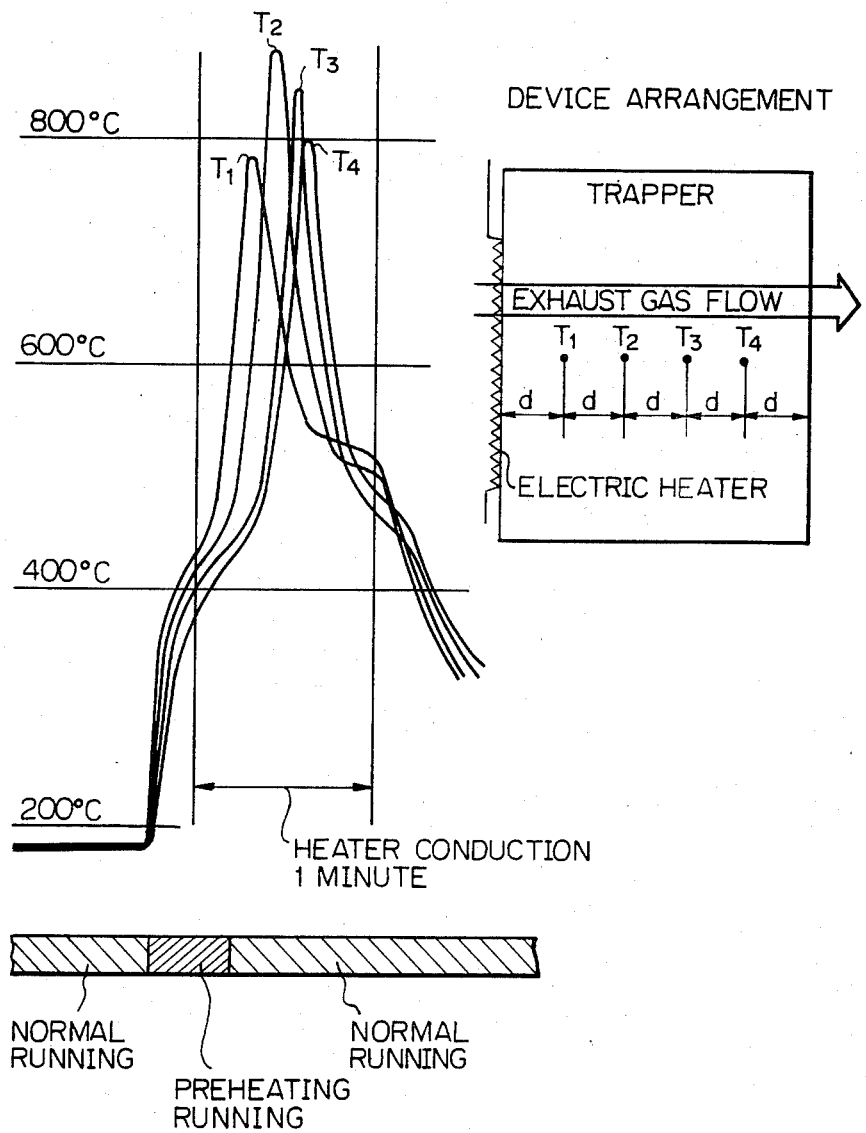
FIG. 7 is a graph showing heater conduction characteristics.

FIG. 6 is a graph showing the fuel injection patterns and corresponding exhaust gas temperature in a normal operation mode and a filter preheating operation mode. Referring to FIG. 6, an injection pattern (PATTERN-1) in the normal operation mode and an injection pattern (PATTERN-2) in the filter preheating operation mode are plotted along the abscissa, and the exhaust gas temperature T(EXHAUST) is plotted along the ordinate. In FIG. 6, a region (REGION-A) above an alternate long and a short dashed line indicates a filter recovery enable temperature region. As compared to the normal operation mode providing an injection per one revolution of the crankshaft, when the divisional injection is performed and the injection timing is delayed, the exhaust gas temperature is notably raised. Note that the engine conditions are an engine speed of 2,070 rpm and an axial torque of 4.2 kg·m. FIG. 7 shows a chart of a change in the filter internal temperature when the system is operated and an arrangement for measuring this change in temperature. Here, an electric heater is provided at the left end of a trapper, a mutual distance d between each two adjacent temperature measurement points $T_1$, $T_2$, $T_3$, and $T_4$ is 25 mm, and the electric heater energization time is 1 minute.

What is claimed:

1. A method of controlling an internal combustion engine having a function of eliminating minute particles in exhaust gas by using a fuel injection valve which is provided in the internal combustion engine and in which a fuel injection timing is controlled, a filter temperature sensor, inserted in an exhaust path, for measuring a temperature of a filter for trapping minute particles in exhaust gas, and an electric heater for removing minute particles deposited on the filter by combustion, said method comprising the steps of:

detecting a filter condition of particle deposition on said filter for which a restoration of a filtering function is required;
 generating a preheating instruction for preheating the filter by raising a filter temperature when said filter condition is detected;
 generating a signal for changing, based on said filter preheating instruction, an injection pattern of the fuel injection valve for preheating the filter;
 determining based on a signal from said filter temperature sensor, whether or not said preheating for raising the filter temperature is completed;
 energizing said electric heater to combust particles on the filter, based on a condition of preheating of said filter; and
 releasing the filter preheating mode after said energization of said electric heater.

2. A control apparatus of an internal combustion engine having a filter which traps minute particles in exhaust gas comprising:

a fuel injection valve which is provided in said internal combustion engine and in which a fuel injection timing is controlled;
 a filter temperature sensor, inserted in an exhaust path, for measuring a temperature of said filter;
 an electric heater for removing minute particles deposited on the filter by combustion;
 filter condition detection means for detecting a condition of particle deposition of the filter for which a restoration of a filtering function is required;
 filter preheating instruction means for generating a preheating instruction to raise the filter temperature, based on the output from said filter condition detection means;
 filter preheating decision means for detecting, based on a signal from said filter temperature sensor, whether or not the preheating to raise the filter temperature, is completed;
 fuel injection instruction means for generating a signal for changing an injection pattern of said fuel injection valve to preheat the filter, based on the output from said filter preheating instruction means;
 filter minute particle combustion instruction means for energizing said electric heater based on the output from said filter preheating decision means; and
 filter preheating mode releasing means for releasing the filter preheating mode after said energizing of said electric heater.

3. An apparatus according to claim 2, wherein said filter condition detection means, said filter preheating instruction means, said filter preheating decision means, said fuel injection instruction means, and said filter minute particle combustion instruction means are realized by functions of a microcomputer.

4. An apparatus according to claim 2, wherein the injection pattern of the fuel injection valve for preheating said filter is changed in such a manner that an injection timing of said fuel injection valve is delayed and a fuel injection quantity thereof is increased so as to prevent a decrease in shaft output due to said delay in injection timing.

5. An apparatus according to claim 2, wherein the injection pattern of said fuel injection valve for preheating said filter is changed by delaying an injection timing and by performing a plurality of injections.

6. An apparatus according to claim 2, wherein an amount of intake air is decreased and an injection timing is delayed when the injection pattern is changed for preheating said filter.

7. An apparatus according to claim 2, wherein a filter differential pressure sensor is provided for detecting a differential pressure before and after said filter, and a signal from said differential pressure sensor is also used for detecting the condition of the filter.

8. A system for eliminating minute particles in exhaust gas comprising:

a fuel injection valve in which a fuel injection pattern of said engine is controlled, by controlling a valve open/close operation by an electrical pulse signal;
 fuel pump means for constantly supplying an upstream side of said fuel injection valve with a high pressure fuel;
 a heatproof filter inserted in an exhaust path for trapping minute particles in exhaust gas;
 differential pressure sensor means for measuring a pressure difference between an upstream side and a downstream side of said filter;
 filter temperature sensor means, inserted in the exhaust path, for measuring a temperature of said filter; and
 an electric heater arranged close to the upstream side of said filter, for eliminating by combustion minute particles deposited on said filter; and
 control means for:
 (a) determining the necessity for restoration of a filtering ability of said filter based on the signal from said differential pressure sensor means;
 (b) selectively commanding a preheating operation for raising the filter temperature based on said determining function (a);
 (c) instructing an injection of fuel by delivering a signal for changing a valve open/close pattern for filter preheating based on said preheating operation;
 (d) determining whether a preheating for raising the filter temperature is completed based on the signal from the filter temperature sensor means;
 (e) instructing a combustion of minute particles in the filter by supplying an electric power to the electric heater for eliminating minute particles in the filter when said filter is preheated.

9. A system according to claim 8, wherein the injection by the fuel injection valve is carried out by delaying the valve opening timing and by a sequence of valve opening operations.

* * * * *